US005317804A

United States Patent [19]

Kasper

[11] Patent Number: 5,317,804

[45] Date of Patent: Jun. 7, 1994

[54] METHOD OF MAKING AN AIR COOLED KICKLESS CABLE

[75] Inventor: James J. Kasper, Sheffield Village, Ohio

[73] Assignee: Watteredge-Uniflex, Inc., Avon Lake, Ohio

[21] Appl. No.: 12,252

[22] Filed: Feb. 1, 1993

[51] Int. Cl.[5] .................... H01R 43/02; H02G 15/02

[52] U.S. Cl. .................... 29/860; 174/74 R; 29/868

[58] Field of Search .................. 174/15.6, 74 R, 74 A, 174/75 R; 29/868, 872, 860, 861; 439/877, 879, 883, 887

[56] References Cited

U.S. PATENT DOCUMENTS

| | | | |
|---|---|---|---|
| 3,127,467 | 3/1964 | Toto | 174/75 R |
| 4,394,533 | 7/1983 | Naito | 439/877 X |
| 4,455,659 | 6/1984 | Kasper et al. | 373/39 |
| 4,640,982 | 2/1987 | Kasper et al. | 174/75 |

*Primary Examiner*—Timothy V. Eley
*Assistant Examiner*—Khan V. Nguyen
*Attorney, Agent, or Firm*—Renner, Otto, Boisselle & Sklar

[57] ABSTRACT

An air cooled kickless cable used in welding has each end of positive and negative stranded rope sets cold formed in a rectangular tube with such rope ends within the tube being formed into a continuous compacted strand with the ropes of the set arranged parallel to the long axis of the rectangle. The rectangle of the tube forms a major flat side which is press welded to one end of a contact plate. The press welding also welds the strands to each other, the strands to the tube, and, in addition the tube to the contact plate. The rope sets are assembled in a spider separator, and twisted with the contact plates fastened together with insulation therebetween. The cable is provided with a perforated cover, end tubes and heat shrink end fittings.

15 Claims, 2 Drawing Sheets

METHOD OF MAKING AN AIR COOLED KICKLESS CABLE

This invention relates generally as indicated to an air cooled kickless cable, and more particularly to such cable and method of fabricating the cable.

BACKGROUND OF THE INVENTION

Kickless welding cables and more particularly air-cooled kickless cables have been utilized for years. Such cables normally comprises two spirally wound sets, one positive and one negative, of cable conductors or ropes with a spider separator therebetween, such ropes being within a cover and connected at each end to a termination which comprises respective machined plates separated by a dielectric gasket. The interconnection between the terminations and the ropes normally involves manual operation such as a torch silver solder or brazing operation. Such prior art connections are thus normally quite labor intensive and subject to normal labor intensive defects. Moreover, when exotic materials are employed such as silver, this adds considerably to the cost. Also, because the termination-to-cable connection is subject to considerable stress during use, such connection may come apart during use resulting in low service life for the entire cable as a result of one faulty connection. The use of special soldering or brazing compositions, etc., can result in a higher resistance connection, particularly if fluxes or compositions other than silver or platinum are used, assuming the parts are made of copper. Higher resistances increase power losses and reduce efficiency. They also increase operating temperatures which further reduces the service life. Thus, there is a need for a low resistance cable termination connection in such air cooled cables which will provide long service life, such low resistance, and which can be manufactured at low cost.

Press welding is a process most commonly used in the formation of bus bars or other laminations. The work to be press welded is positioned between the conductive electrodes of a press welder. The electrodes usually are graphite blocks movable with respect to each other, usually by the operation of pneumatic cylinders. As the name implies, substantial pressure may be generated as well as a very high heat. The temperature and pressure are carefully controlled and partial welding fusion does take place among the parts between the electrodes. However, excess temperature and pressure can ruin the part. A properly press welded part has an electrical resistance the equivalent of a solid part, and provides a strong connection. Examples of press welding may be seen in prior U.S. Pat. Nos. 4,640,982 and 4,455,659.

U.S. Pat. No. 4,640,982 illustrates press welding used to form a termination in a two rope DC kickless water cooled cable using a specially formed D-clip on the end of each of the two ropes to fit with a specially machined termination allowing for water passages therethrough. Air cooled kickless cables, however, employ sets of positive and negative stranded ropes. A typical number would be six, with two sets of three. Some even use eight with two sets of four. Because of the large number of ropes cables, the need for relatively flat surfaces avoiding pressure concentrations, and the need for special rope orientations, multi-stranded rope or cable termination are difficult to form. It would accordingly be desirable if press welding techniques could be applied to multi-rope air cooled kickless cables providing a lower cost, longer life, and more efficient cable.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

SUMMARY OF THE INVENTION

An air cooled kickless cable used in welding has each end of positive and negative stranded rope sets cold formed in a rectangular tube with such rope ends within the tube being formed into a continuous compacted strand with the ropes of the set arranged parallel to the long axis of the rectangle. The rectangle of the tube forms a major flat side which is press welded to one end of a contact plate. The press welding also welds the strands to each other, the strands to the tube, and, in addition the tube to the contact plate. The rope sets are assembled in a spider separator, and twisted with the contact plates fastened together with insulation therebetween. The cable is provided with a perforated cover, end tubes and heat shrink end fittings.

DETAILED DESCRIPTION OF THE PREFERRED EMBODIMENTS

Figure 1:
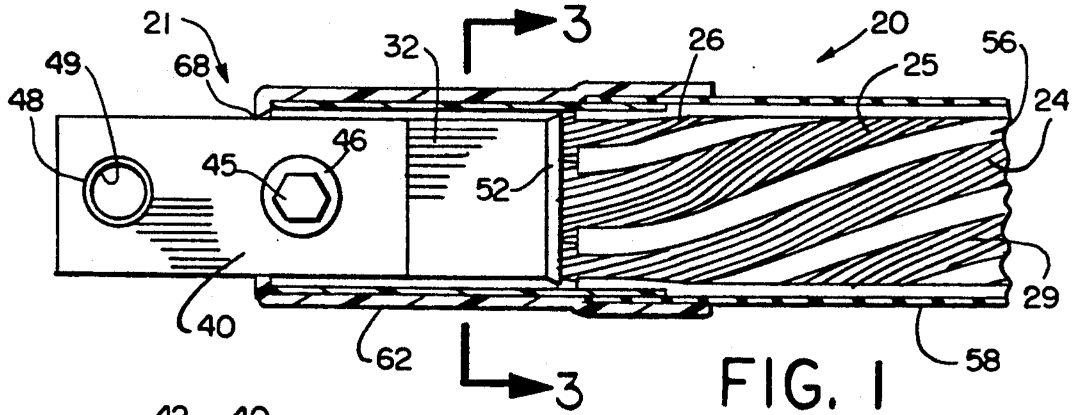
FIG. 1 is a fragmentary longitudinal section of one termination of an air cooled kickless cable in accordance with the present invention.
Figure 3:
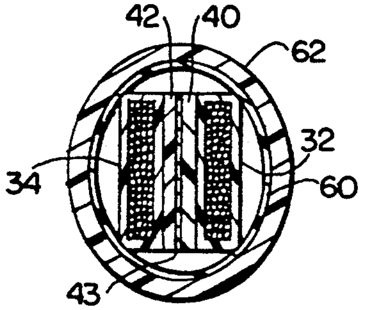
FIG. 3 is a transverse section taken on the line 3—3 of FIG. 1.

Referring initially to FIGS. 1–4, there is illustrated an air cooled kickless cable shown generally at 20 with a termination 21 at the end thereof. It will be appreciated that the cable may vary in length and there will be a termination at each end. The cable comprises the desired size MCM copper stranded ropes indicated at 24, 25, 26, 27, 28 and 29. In the illustrated embodiment, there are six altogether, which are arranged in two sets of three each, one being a positive set and the opposite being the negative set. The term MCM means 1000 circular mills and the stranded copper ropes may typically be anywhere from 300–800 MCM sizes, although smaller or larger circular mill sizes may be built.

In the illustrated embodiment, one of the sets of three may be formed by the copper stranded ropes 24, 25 and 26, while the other set comprises the ropes 27, 28 and 29. The first set of three may be the positive set while the second set of three is the negative set. The first set extends into the rectangular tube 32, while the second set extends into rectangular tube 34. Each tube is provided with a major flat side indicated at 36 and 38, respectively, and the entire rope assembly or set encased in the rectangular tube is press welded, respectively to copper termination plates 40 and 42, which are separated by MICARTA electrical insulation indicated at 43. The termination plates are held together by a stainless steel fastener indicated at 45 which is also insulated from one of the plates by the insulator 46. The insulator 46 may include a sleeve which precludes contact between the fastener and the plate 40. The contact or termination plates extending from the kickless cable are provided with aligned holes indicated at 48 which are also provided with MICARTA insulation liners 49.

The stranded copper ropes project from the rectangular tubes through stress relief flared sections 52 and 53. The corners of these flared stress relief sections may be slightly radiused so that no sharp interior corner of the rectangular tube engages a strand of the copper ropes. The stress relief portions extend completely around the periphery of the inner ends of the rectangular tubes.

Figure 4:
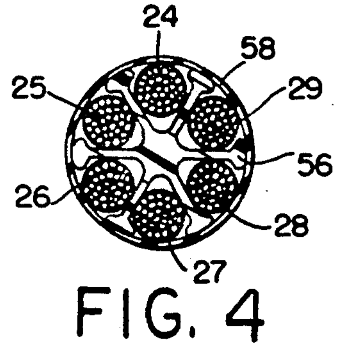
FIG. 4 is a transverse section taken on the line 4—4 of FIG. 2.
Figure 2:
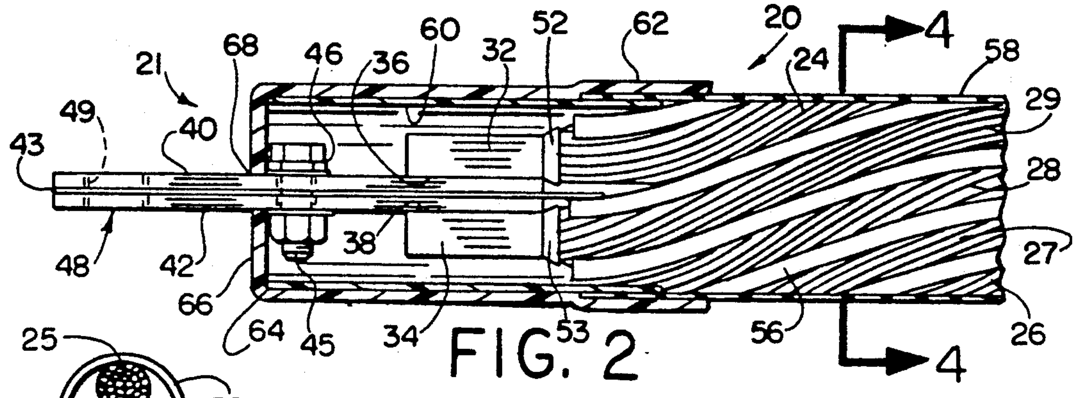
FIG. 2 is a similar section seen from the bottom of FIG. 1.

As seen more clearly in FIG. 4, the rope sets are mounted in a star separator shown generally at 56. The star separator may be an EDPM silicone rubber extrusion which separates each of the six ropes with each set occupying a semi-circle of the separator. As illustrated, the copper stranded ropes as well as the star separator are twisted or are in a spiral formation from one termination to the other.

The kickless cable is provided with a perforated cover seen at 58 which may actually be a perforated fire hose. Telescoped within the end the cover and extending over the copper stranded ropes is a nylon sleeve at each end which is seen at 60. The nylon sleeve extends from the copper stranded ropes and the end of the cover to just beyond the fastener 45. A shrink wrap PVC fitting seen at 62 is then formed over the section of the nylon sleeve tightly embracing both the end of the cover, and the outer end of the sleeve seen at 64. The shrink wrap fitting forms an end wall 66 normal to the termination plates and also a rectangular opening 68 through which the termination plates project. The shrink wrap fitting seals the fastener 45 within the nylon sleeve and also serves to lock the termination with respect to the cover to resist any attempt on the part of the cable to unwind or straighten out.

Figure 5:
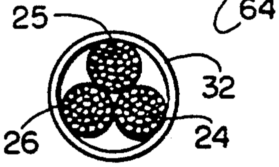
FIG. 5 is an end view of a set of copper ropes inserted in a copper tube at an early stage in the process of making the cable.

The process of making the kickless cable of the present invention is described beginning with the illustration of FIG. 5. The initial step is to cut six pieces of the desired size MCM copper rope to the desired length. The six pieces are then divided into two sets of three each with three pieces becoming the positive, and three the negative. The ends of a three-piece set are inserted into copper tube 32 as seen in FIG. 5 which at this stage of the process is in circular section. The ends of the set are transversely aligned with one end of the copper tube with the set projecting from the opposite end.

Figure 6:
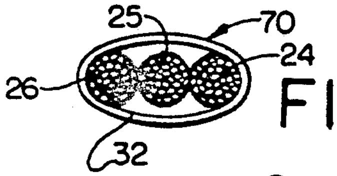
FIG. 6 is a similar view with the tube partially deformed.
Figure 8:
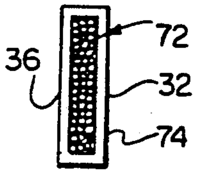
FIG. 8 is an end elevation of the cold formed set end seen from the left hand side of FIG. 7.
Figure 7:
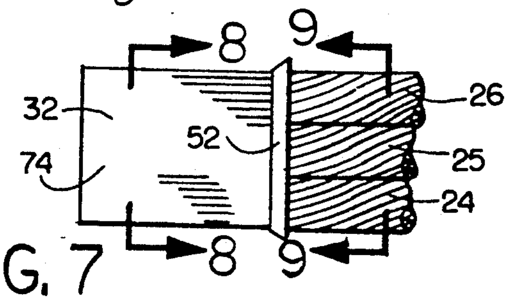
FIG. 7 is a fragmentary top plan view of the set end with the tube fully swaged or cold formed in a proper die set.
Figure 9:
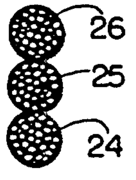
FIG. 9 is a section through the rope set seen from the line 9—9 of FIG. 7.

As seen in FIG. 6, the initial deformation of the copper tube 32 is to a slightly oval form indicated at 70 which allows the stranded copper rope 25 to be positioned between the ropes 26 and 24. The set end, including the deformed tube, is now placed in a proper die set for cold forming or swaging to the rectangular configuration seen more clearly in FIGS. 3 and 8. In the cold forming process converting the tube from the circular or oval configuration to the rectangular configuration, the cross sectional area of the tube actually diminishes and the wall thickness increases. The end portions of the three copper stranded ropes are compacted in the center of the now rectangular tube as seen in FIG. 8, forming a central core or mass of copper stranding indicated at 72 which has essentially no voids. The cold forming process forms the rectangular tube and provides a major flat side 36 on one side and a major flat side 74 on the other. As hereinafter described, these major flat sides are designed to be parallel to or engage similar parallel flat surfaces on the press welding electrodes. The cold forming process also forms the skirt or flared section 52 which relieves the inner inside edge of the tube where the now side-by-side and essentially coplanar copper ropes exit the tube as seen. The cold forming of the tube thus forms a relatively solid mass of copper strands in a rectangular flatsided configuration which has a long axis parallel and essentially coplanar with the plane of the axes of the side-by-side ropes 24, 25, and 26.

Figure 10:
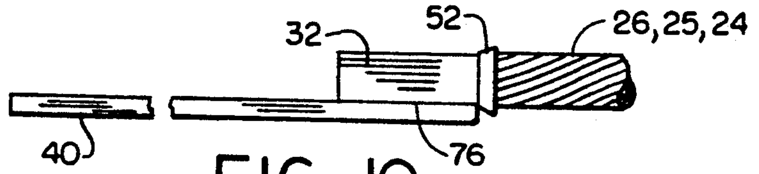
FIG. 10 is a side elevation of a termination plate press welded to one major flat side of the cold formed tube.
Figure 12:
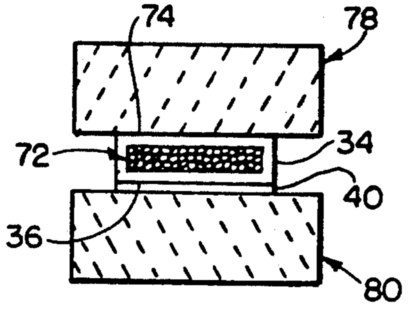
FIG. 12 is a view of the press welding electrodes with the tube and plate clamped therebetween.
Figure 11:
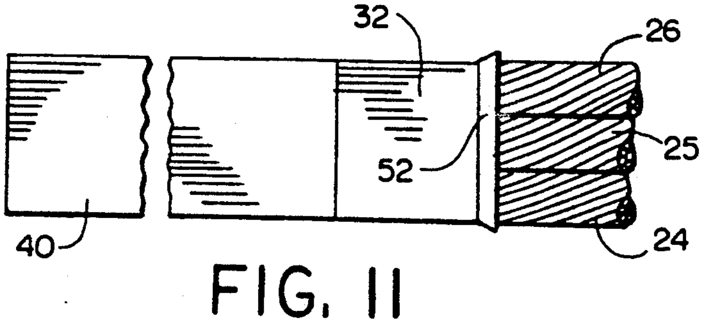
FIG. 11 is a top plan view of the tube and connected plate.

Turning now to FIGS. 10, 11 and 12, it will be seen that three-rope assembly thus formed is assembled with a copper contact plate 40 through a press weld connection indicated at 76. The termination plate 40 is positioned so that its inner end extends almost to the stress relief section 52 while the outer end projects substantially beyond the end of the three-rope assembly. The press weld is formed between the graphite electrodes 78 and 80 seen in FIG. 12 under significant pressure and heat. The press weld operation not only joins the termination plate 40 to the flat side 36 of the rectangular tube 32, but also at least partially bonds the copper stranding of the ropes to each other and to the interior of the rectangular tube 32. Tests have indicated that press welding achieves partial fusion or bonding between the components between the electrodes and provides a resistance which is the equivalent of a solid piece of metal of the same configuration. In addition, the press welding provides a much stronger connection able to withstand the vicissitudes of the continued operation of the cable.

Figure 13:
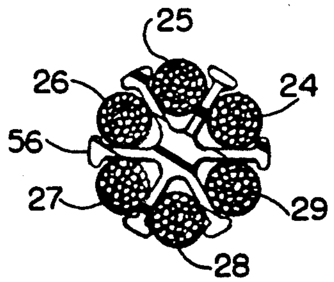
FIG. 13 is a transverse section of the cable with the two sets, one positive and one negative, positioned in a spider separator; and, FIG. 14 is a fragmentary elevation of the assembled cable termination after twisting and before the application of the cover, end tubes, and heat shrink end fittings illustrated in FIGS. 1 and 2.
Figure 14:
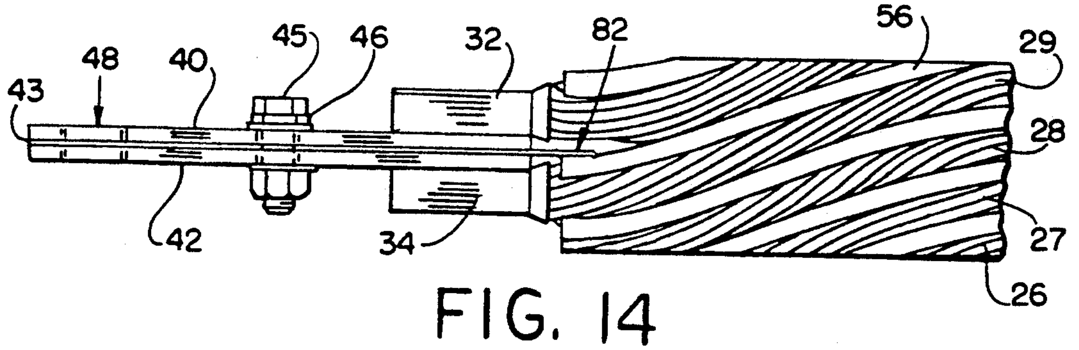

The process described above is, of course, repeated for each end of each three-rope set. Care is taken that the ropes of each set are in essence arranged coplanar or with the long axis of the rectangular tube at each end. After the press welding process and the assembly of the contact plates to the flat side of the tube, the two three-rope assemblies are then positioned in a spider separator as seen in FIG. 13. All of the ropes of a set are in one semi-circle of the separator. The next step is to align the copper contact plates 40 and 42 as seen in FIG. 14 at both ends with the MICARTA insulator 43 therebetween. Holes are then drilled for the assembly bolt or fastener 45 as well as the termination hole 48 to the customer's specification. It is noted that the inner end of the MICARTA insulation between the two plates 40 and 42 slightly overlaps the spider 56 and a suitable slot or cut out in one or the other may be provided to accommodate this overlap. After the insulation and fasteners are secured in place, the entire assembly is twisted a certain number of turns from one end to the other as seen in FIG. 14.

The final steps in the process begin with the installation of the cover 58 which, as indicated, may be in the form of a perforated fire hose. When the cover is in place, then nylon sleeves 60 are installed at each end telescoped within the end of the cover. Finally, the shrink wrap fitting 62 is positioned at each end and shrunk to embrace the outer circumference of the cover on the inner end and to form the wall 66 on the outer end enclosing the fastener 45 within the end of the sleeve 60. In this manner, the shrink wrap fitting which closely embraces the contact plates at the opening 68 constitutes an extension of the cover which tends to resist any untwisting of the cable. The final step in assembly is to clean and polish the contact areas.

It can now be seen that there is provided an improved and more efficient air cooled kickless cable which has a longer service life, and a process of making that cable which is more expedient and requires less skilled labor intensive steps such as torch silver solder or brazing.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A method of making an air cooled kickless cable comprising the steps of:

forming equal lengths of copper stranded rope,
forming two equal sets from such equal lengths,
inserting each end of each set into a short length of copper tube, and for each set
cold forming the tube into a rectangular flat configuration with each set extending from the formed tube side-by-side in a common plane parallel to a major flat side of the formed tube, the stranding within said formed tube being compacted and without substantial voids,
placing a major flat side of each said formed tube against one end of a flat copper plate, the opposite end of said flat copper plate projecting from said formed tube away from said ropes and substantially parallel to the plane of said side-by-side set;
press welding each said formed tube and the stranding therein to said flat copper plate, and then
inserting the stranded ropes from each set in a circular spider separator so that the ropes of each set are all in one semi-circle of the separator, and the flat copper plates at each end are juxtaposed and transversely aligned,
inserting an electrical insulation plate between the juxtaposed and aligned flat copper plates, and
securing the plates together with the insulation therebetween.

2. A method as set forth in claim 1 wherein said copper tube is initially formed into an oval to accommodate the ends of each set side-by-side.

3. A method as set forth in claim 1 wherein the cross sectional area of said tube before cold forming is greater than such area after forming.

4. A method as set forth in claim 1 wherein the wall thickness of said tube before forming is less than that after forming.

5. A method as set forth in claim 1 wherein said tube is formed with a stress relief section away from the end of the set.

6. A method as set forth in claim 1 wherein said rope sets are twisted before said plates are secured together with the insulation therebetween.

7. A method as set forth in claim 6 including the step of enclosing said cable in a perforated cover, providing a plastic sleeve extension beyond each end of said cover, and embracing the plastic sleeve extension with a shrink wrap fitting which embraces the cover at its inner end and the copper plates at its outer end which extend there beyond.

8. A method as set forth in claim 7 wherein said plates are secured together with the insulation therebetween by an insulated fastener.

9. A method as set forth in claim 8 wherein said plastic sleeve extension extends beyond said fastener which is enclosed within said plastic sleeve extension by the respective shrink wrap fitting.

10. A method of making an air cooled kickless cable comprising the steps of:

forming an even number of equal lengths of copper stranded rope,
forming two sets from said even number of equal lengths,
inserting each end of each set into a short length of copper tube, and for each set
cold forming each tube into a rectangular flat configuration with the ropes of each set extending from the formed tube side-by-side in a common plane parallel to a major flat side of the formed tube, the stranding within said formed tube being without substantial voids,
placing a major flat side of each formed tube against one end of a flat copper plate, the opposite end of said flat copper plate projecting from each formed tube away from said ropes and substantially parallel to the plane of said side-by-side set of ropes, and then
press welding each said formed tube and the stranding therein to said respective plate,
inserting the stranded ropes from each set in a circular spider separator so that the ropes of each set are all in one semi-circle of the separator, and the flat copper plates at each end are juxtaposed and transversely aligned,
inserting an electrical insulation plate between the juxtaposed and aligned flat copper plates, and then
securing the plates together with the insulation therebetween.

11. A method as set forth in claim 10 including the step of twisting the ropes after insertion in the spider separator and before securing the flat copper plates together with the insulation therebetween.

12. A method as set forth in claim 11 including the step of enclosing the cable in a perforated cover.

13. A method as set forth in claim 10 including the step of forming the copper tube initially into an oval configuration before forming the rectangular configuration to ensure the proper side-by-side arrangement of the rope ends.

14. A method as set forth in claim 13 including the step of reducing the cross sectional area and increasing the wall thickness of the tube as it is cold formed.

15. A method as set forth in claim 14 including the step of forming a stress relief section along the edge of the tube away from the end of each set.

* * * * *